(12) United States Patent
Friedman et al.

(10) Patent No.: US 6,554,769 B1
(45) Date of Patent: Apr. 29, 2003

(54) METHOD AND APPARATUS FOR DETERMINING THE RELATIVE LOCATION OF TOMOGRAPH SLICES

(75) Inventors: Zvi Friedman, Kiriat Bialik (IL); Allan Entis, Tel Aviv (IL)

(73) Assignee: GE Ultrasound Israel Ltd., Tirat-Hacarmel (IL)

(*) Notice: Subject to any disclaimer, the term of this patent is extended or adjusted under 35 U.S.C. 154(b) by 0 days.

(21) Appl. No.: 09/582,799

(22) PCT Filed: Dec. 31, 1997

(86) PCT No.: PCT/IL97/00442
§ 371 (c)(1),
(2), (4) Date: Jun. 29, 2000

(87) PCT Pub. No.: WO99/35511
PCT Pub. Date: Jul. 15, 1999

(51) Int. Cl.[7] ............................... A61B 8/00
(52) U.S. Cl. .................. 600/437; 600/443; 128/916
(58) Field of Search ................ 600/432, 443, 600/444, 447, 449, 448; 128/916

(56) References Cited

U.S. PATENT DOCUMENTS

| 5,487,388 A | | 1/1996 | Rello et al. |
| 5,503,152 A | | 4/1996 | Oakley et al. |
| 5,865,750 A | * | 2/1999 | Hatfield et al. ............. 600/443 |
| 6,155,978 A | * | 12/2000 | Cline et al. ................. 600/443 |

FOREIGN PATENT DOCUMENTS

| WO | WO 96/00402 | 1/1996 |
| WO | WO 97/00482 | 1/1997 |

* cited by examiner

Primary Examiner—Marvin M. Lateef
Assistant Examiner—Maulin Patel
(74) Attorney, Agent, or Firm—Fenster & Company Patent Attorneys, Ltd.

(57) ABSTRACT

A method and apparatus are provided for ultrasound imaging wherein ultrasound imaging data is acquired at points in a plurality of imaging slices and the ultrasound imaging data is used to determine the relative positions of the slices.

29 Claims, 3 Drawing Sheets

FIG.2

FIG. 3

METHOD AND APPARATUS FOR DETERMINING THE RELATIVE LOCATION OF TOMOGRAPH SLICES

RELATED APPLICATIONS

The present application is a U.S. national application of PCT/IL97/00442, filed Dec. 31, 1997.

FIELD OF THE INVENTION

The invention relates to the determination of the relative spatial position of two surfaces from values of functions on the two surfaces and especially to the determination of the relative position of the planes of two ultrasound tomography slices.

BACKGROUND OF THE INVENTION

In many ultrasonic imagers, a hand unit is used to scan an object and acquire data for images of tomograph slices of the object. The unit transmits ultrasound pulses into the object and receives reflections of these pulses from structures in the tomograph slices of the object. An operator holds the hand unit and moves it over that portion of the object that is being imaged. Data for an image of a complete slice of the object is acquired rapidly so that as the operator moves the hand unit over the object being imaged, imaging data for many closely spaced slices is acquired.

In order to construct an accurate three dimensional image of the portion of the object scanned, the location and orientation of the tomograph slices with respect to each other must be accurately known. The location of a tomograph slice with respect to the hand unit, and the locations of points, hereafter referred to as "data points", in the tomograph slice at which data are acquired, are accurately known from the structure of the hand unit. However, the structure of the hand unit does not provide any information as to where the tomograph slices are located with respect to each other. In order to determine the relative locations of the tomograph slices, the location and orientation of the hand unit for each tomograph slice for which data is acquired is determined. This is generally done by monitoring the location and orientation of the hand unit with respect to a reference coordinate system fixed in the room in which the ultrasound equipment is operated. The location and orientation of the reference coordinate system is defined by an array of receivers appropriately positioned in the room. The hand unit is equipped with transmitters that transmit signals to these receivers. The location and orientation of the hand unit can be accurately determined from these signals at any time while the hand unit is scanning the object. This system for locating the hand unit and the tomograph slices for which data is acquired is expensive and cumbersome and precludes the possibility of easily moving the ultrasound equipment from place to place.

A mechanical system for locating the position and orientation of a source of ultrasound energy used to produce a three dimensional image an object is described in U.S. Pat. No. 5,487,388 to M. J. Rello et al. In this patent the source described emits a thin planar fan beam of ultrasound energy. The source is fixed to a mechanical stage which rotates the source about a fixed axis of rotation to accurately position the fan beam at different known angles around the fixed axis.

U.S. Pat. No. 5,503,152 to C. G. Oakley et al describes using two elongated arrays of transducers in fixed relation to each other to produce a three dimensional image of an object in a thick volume slice of the object. The slice of the object imaged is an "overlap" volume of the object which is illuminated by ultrasound energy from both arrays. The two arrays receive reflections of ultrasound pulses from the same structures in the overlap volume with different time delays. The time delays are translated into distances from the arrays and the structures are located in the overlap region using triangulation and the distance between the arrays. To produce an image of extended volumes, a transducer assembly is mounted to a mechanical device which moves a transducer assembly over a wide range of controllable positions.

It would be advantageous to have a system for locating the relative positions of ultrasound tomograph slices acquired with a mobile hand source of ultrasound energy that did not depend upon locating the position of the moving source with respect to a fixed reference coordinate system.

SUMMARY OF INVENTION

It is an object of some aspects of the present invention to provide a relatively simple and inexpensive method for accurately locating the relative positions of tomograph slices at which image data for an ultrasound image of an object are acquired.

In a preferred embodiment of the present invention, the relative locations and orientations of tomograph slices are determined by calculation based on the acquired image data. The method determines the location of the slices without the need to determine the location and orientation of the slices with respect to a fixed reference coordinate system.

For each of a plurality of tomograph slices, values for the image data and values for the first spatial derivative of the image data in the direction perpendicular to the plane of the slice are acquired for a plurality of data points in the slice. For each particular slice, the data points are located in the space of the slice by coordinate values measured relative to a coordinate system specific to the particular slice, which coordinate system is defined and known with respect to the plane of the slice. Preferably, the origin of the coordinate system is located at a point in the plane of the slice, the x and y axes are in the plane of the slice and the z axis is perpendicular to the plane of the slice. Spatial derivatives of the image data at data points in the plane of the slice along the x and y axes are calculated from differences between values of the image data at data points in the slice. The coordinate systems specific to different slices are not the same. They may be displaced one from the other and/or their coordinate axes may be rotated with respect to each other.

Since for each slice, the image data and its first spatial derivatives are known at data points in the slice, first order Taylor series can be expanded about these data points that provide estimates of the image data in volumes of space centered at the data points. As a result, for any given tomograph slice, the image data is known in a volume of space centered about the slice, hereafter referred to as the "Taylor volume". The Taylor volume extends about the plane of the tomograph slice to points located at distances from the plane for which the Taylor series expanded about the data points provide substantially accurate estimates of the image data.

In accordance with a preferred embodiment of the present invention, adjacent tomograph slices are located sufficiently close together so that at least one of the adjacent slices, hereafter referred to as the "target slice" is located inside the Taylor volume of the other slice, hereafter referred to as the "Taylor slice". For a point on the target slice, a measured value of the image data, and a value of the image data for the same point, calculated from a Taylor series expanded about a data point in the Taylor slice, must be the same. In accordance with a preferred embodiment of the present invention, the relative location and orientation of the two adjacent tomograph slices are determined from the requirement that Taylor series expansions of the image data from points in the Taylor slice must provide values for the image data, at points on the target slice, that are substantially the same as the measured values of the image data at the points on the target slice.

In accordance with a preferred embodiment of the present invention, the relative locations and orientations of the specific coordinate systems associated with a plurality of adjacent tomograph slices are determined. Once this is accomplished, image data acquired as functions of the coordinates of the various specific coordinate systems a preferably transformed to a single common coordinate system. The images of the object from the various tomograph slices are then be correlated with each other and an accurate image of the volume of the object containing the tomograph slices is constructed.

Let x,y,z, (in vector notation $\vec{x}$), represent the coordinates of points in a Taylor slice with respect to a coordinate system, hereafter referred to as a "Taylor" coordinate system, specific to the Taylor slice. Let x',y',z' (in vector notation $\vec{x}'$), represent the coordinates of points in a target slice, adjacent to the Taylor slice, with respect to a coordinate system, hereafter a "target" coordinate system, specific to the target slice. The location and orientation of the target coordinate system with respect to the Taylor coordinate system can be defined by the components, in the Taylor coordinate system, of the vector extending from the origin of the Taylor coordinate system to the origin of the target coordinate system, and angles of rotation of the target coordinate system about the z', x', and z' axes respectively of the target coordinate system. A transform, "T", which is a function of these vector components and angles of rotations, transforms the coordinates of a point in space defined relative to the Taylor coordinate system to the coordinates of the same point defined relative to the target coordinate system. If these vector components and angles of rotation are denoted respectively by, X,Y,Z, $\phi,\theta,\alpha$, then, $\vec{x}'=T(X,Y,Z,\phi,\theta,\alpha,)\vec{x}=T\vec{x}$ and $\vec{x}=T^{-1}(X,Y,Z,\phi,\theta,\alpha)\vec{x}'=T^{-1}\vec{x}'$.

Let the image data, as functions of the coordinates of a point defined with respect to the Taylor and target coordinate systems, be represented respectively by the values of ultrasound imaging functions $F(x,y,z)=F(\vec{x})$ and $f(x',y',z')=f(\vec{x}')$. Then, for a point "n", with coordinates $\vec{x}'|_n$, in the target coordinate system and $\vec{x}|_n=T^{-1}\vec{x}'|_n$ in the Taylor coordinate system $f(\vec{x}')|_n=F(T^{-1}\vec{x}')|_n$, where the symbol "$|_n$" indicates that the expression or quantity is to be evaluated for the point n. If $f(\vec{x}')$ is measured for at least 6 points n, n=1 . . . 6, and the form of $F(\vec{x})$ as a function of $\vec{x}$ is known, then the six equations $[f(\vec{x}')-F(T^{-1}\vec{x}')]|_n=0$ for n=1 . . . 6 determine the 6 independent variables, X,Y,Z,$\phi$, $\theta,\alpha$, on which T depends and which define the relative location and orientation of the Taylor and target coordinate systems.

In accordance with a preferred embodiment of the present invention, the form of $F(\vec{x}')$ is known in the Taylor volume of the Taylor slice from its first order Taylor expansions about points on the plane of the Taylor volume. Additionally, in accordance with a preferred embodiment of the present invention, the points on the plane of the target slice for which $f(\vec{x}')$ is evaluated are located in the Taylor volume of the Taylor slice. As a result, the values of X,Y,Z,$\phi\theta,\alpha$, which define the relative location and orientation of the two tomograph slices can be calculated.

Generally, the values for the coordinates $\vec{x}$ and $\vec{x}'$, and for measured values of $F(\vec{x}')$ and $f(\vec{x}')$ and their derivatives normal to their respective tomograph slice planes, hereafter referred to as "normal derivatives", are not known exactly but are associated with a degree of uncertainty. For example, the uncertainty with which the functions $F(\vec{x})$ and $f(\vec{x}')$ and their respective normal derivatives are known, is much higher for data points further from the source of ultrasound waves used in an ultrasound imaging of an object than for data points closer to the source of ultrasound waves. In a preferred embodiment in accordance with the present invention the values for X,Y,Z,$\phi,\theta,\alpha$, are calculated from equations which incorporate these uncertainties. Preferably, a set of equations are used to calculate values for X,Y,Z,$\phi,\theta,\alpha$, which minimize the differences between $f(\vec{x}')$ and $F(T^{-1}\vec{x}')$ for a plurality of points n. Preferably, the equations result from a least squares minimization procedure that minimizes the sum $$S = \sum_{n=1}^{N} \left( [f(\vec{x}') - F(T^{-1}\vec{x})] / \sigma(\vec{x}', T^{-1}\vec{x}')^2 \right)\Big|_n$$

as a function of the variables X,Y,Z,$\phi,\theta,\alpha$. In the expression for S, N is the number of the plurality of points used in the sum and $\sigma(\vec{x}',T^{-1}\vec{x}')|_n$ represents a quantity which is a function of the uncertainties with which $\vec{x}$, $\vec{x}'$, $F(\vec{x})$ and $f(\vec{x}')$ are known for the point n.

Let the variables X,Y,Z,$\phi,\theta,\alpha$, be represented respectively by the components of a "6" vector $v_k$, where k assumes the integer values from 1–6. Then the least squares minimization of S expressed using $v_k$ requires that $$\partial\{S\}/\partial v_k = \partial \left\{ \sum_{n=1}^{N} ([f(\vec{x}') - F(T^{-1}\vec{x})]/\sigma(\vec{x}', T^{-1}\vec{x}'))^2 \Big|_n \right\} / \partial v_k = 0$$

for k=1 . . . 6. These equations can be mathematically quite involved and computationally expensive to solve. In some preferred embodiments of the present invention simplifying assumptions are made which make the least squares procedure for minimizing S more tractable. Preferably, it is assumed that the derivatives of $\sigma(\vec{x}',T^{-1}\vec{x}')|_n$ with respect to $v_k$ are 0 so that $\sigma(\vec{x}',T^{-1}\vec{x}')|_n=\sigma(\vec{x}')$ (i.e. no dependence upon T), and $$\partial\{S\}/\partial v_k = \partial \left\{ \sum_{n=1}^{N} ([f(\vec{x}') - F(T^{-1}\vec{x}')]^2 / \sigma(\vec{x}')^2)\Big|_n \right\} / \partial v_k = 0.$$

In an alternate preferred embodiment of the present invention, variations in the uncertainties with which $\vec{x}$, $\vec{x}'$, $F(\vec{x})$ and $f(\vec{x}')$ are known as a function of the positions of points n are ignored altogether, and $\sigma(\vec{x}',T^{-1}\vec{x}')|_n$ is set equal to 1. The following discussion is independent of whether σ is utilized.

Preferably, N is the smallest integer possible greater than 6, that provides the desired accuracy for the values of $v_k$ (i.e. for X,Y,Z,φ,θ,α). Preferably, $\partial\{S\}/\partial v_k=0$ is first solved for N equal to a small integer greater than or equal to 6 and then solved in an iterative procedure for increasing values of N until a desired accuracy for $v_k$ is reached. In some preferred embodiments in accordance with the present invention trigonometric functions which appear in the transformation T are approximated using small angle approximations of the trigonometric functions.

It is an object of another aspect of the present invention to provide a device for ultrasound imaging of an object that acquires ultrasound image data and values for the normal derivative of the image data at data points in tomograph slices of the object.

An ultrasound imaging device, in accordance with a preferred embodiment of the present invention, comprises a scanning unit for acquiring image data, wherein the scanning unit comprises two parallel linear phased arrays of ultrasound transducers which transmit and receive sound waves used for imaging the object. The two phased arrays are preferably closely spaced one to the other. As a result, when the unit scans the object, values for the image data are acquired for data points on two parallel, very closely spaced, planes through the object. The average of the values of the image data at a first point on one of the planes and at a second point on the other plane adjacent to the first point, provides a value for the image data at the point midway between the first and second points, for the tomograph slice defined by the volume between the two planes. The difference between the values of the image data at the first and second points, divided by the distance between the two planes, provides the derivative of the image data normal to the plane of the tomograph slice at the point midway between the first and second points.

There is therefore provided in accordance with a preferred embodiment of the present invention a method of ultrasound imaging comprising: (a) acquiring ultrasound image data in a first slice defined by a first plane in a first coordinate system; (b) acquiring ultrasound image data in a second slice defined by a second plane in a second coordinate system different from the first coordinate system; (c) determining ultrasound image data in a region adjacent to at least one of said first and second planes; and (e) determining a coordinate transformation between the first and second coordinate systems based on said acquired ultrasound image data and said determined ultrasound image data.

Preferably, determining ultrasound image data in regions adjacent at least one of said first and second planes comprises acquiring image data outside of the plane of the slice. Alternatively or additionally, the method preferably comprises determining spatial derivatives of said image data at points in at least one of said first and second planes, said derivatives comprising derivatives of image data with respect to the normal to the plane. Preferably, said derivatives comprise derivatives of said image data along directions parallel to the plane.

In some preferred embodiments of the present invention determining a coordinate transform comprises: defining a first function of coordinates of the first coordinate system representative of said ultrasound image data of said first slice; defining a second function of coordinates of the second coordinate system representative of said ultrasound image data of said second slice; and requiring that said first and second functions be substantially equal at each of a plurality of points in space. Preferably, defining said first function comprises determining spatial derivatives for said fist slice and defining a plurality of Taylor series wherein each Taylor series is expanded about a point in the plane of the first slice. Preferably, said Taylor series comprises a first order Taylor series.

In some preferred embodiments of the present invention image data at a second point on the plane of the second slice is matched to image data from the first slice and wherein said matching is performed by matching said second slice image data to a Taylor series of image data expanded about a first point on the plane of said first slice. Preferably, said first point has the same coordinates in said first coordinate system as said second point in said second coordinate system.

Preferably, said transformation is derived by matching a plurality of said first points to a plurality of said second points. Preferably, said transformation is derived using an optimization procedure. Additionally or alternatively, points of the plurality of points preferably have a large first derivative. Additionally or alternatively, at least some points of the plurality of points are preferably spatially relatively far apart.

Additionally or alternatively, the number of sets of first and second points is preferably greater than the number of independent parameters required for defining said transformation. Additionally or alternatively, the optimizing procedure is preferably a least squares procedure. Additionally or alternatively, said optimizing procedure incorporates weighting factors that are functions of the accuracy with which locations of and image data values at the first and second points are known. Preferably, the weighting factors are independent of the transformation.

In some preferred embodiments of the present invention, determining said transformation comprises determining said transformation at each iteration of an iterative procedure wherein results of a determination of said transformation in one iteration are used in a determination of the transformation in a subsequent iteration. Preferably, determining said transformation comprises defining at least one measure of the accuracy of the determination of said transformation at each iteration and determining a cutoff value for each of said at least one measure of accuracy. Preferably, said measure of accuracy is a deviations mean square test. Preferably, said measure of accuracy is an F test.

In some preferred embodiments of the present invention, said transformation is applied to data in one of said coordinate systems and including: determining an improved coordinate transformation between the first and second coordinate systems based on said acquired ultrasound image data and said determined ultrasound image data. Preferably, determining an improved coordinate transformation comprises matching image data at a second point on the second slice to image data from the first slice and wherein said matching is performed by matching said second slice image data to a Taylor series of image data expanded about a first point on said first slice. Preferably, said first point has the same coordinates in said first coordinate system as said second point in said second coordinate system after applying said transformation. Additionally or alternatively, said improved coordinate transformation is derived by matching a plurality of said first points to a plurality of said second points in an optimization procedure.

There is further provided in accordance with a preferred embodiment of the present invention an apparatus for three dimensional ultrasound imaging of an object comprising: transducers arrayed in a geometry to acquire ultrasound imaging data in an imaging slice of the object, which imaging slice is defined by a plane, so that data of the acquired data is acquired at points on both sides of the plane of the slice; a processor which processes said data to provide spatial derivatives of said data along directions parallel and perpendicular to the plane of the imaging slice; and wherein said processor determines the relative positions of a plurality of imaging slices using said acquired data and said derivatives to provide a three dimensional image of said object.

BRIEF DESCRIPTION OF FIGURES

The invention will be more clearly understood by reference to the following description of preferred embodiments thereof in conjunction with the figures, wherein identical structures, elements or parts which appear in the figures are labeled with the same numeral, and in which.

DESCRIPTION OF PREFERRED EMBODIMENTS OF THE INVENTION

Figure 1A:
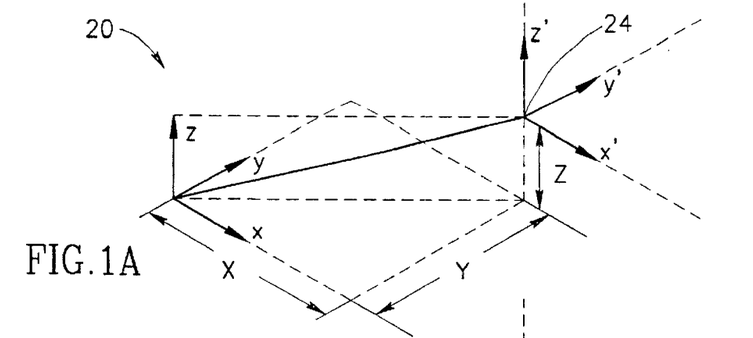
FIGS. 1A–1D show schematically a set of displacements and rotations that transform a first position of a set of coordinate of axes to a second position of the set of coordinate axes.
Figure 1B:
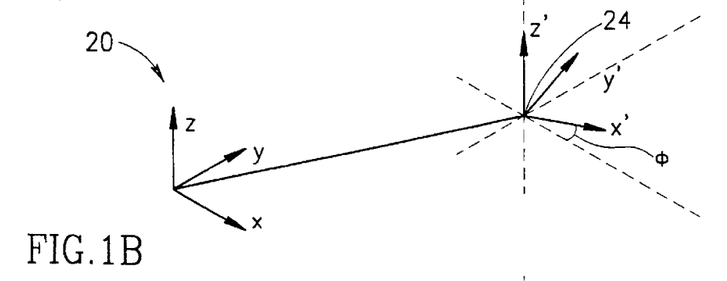
Figure 1C:
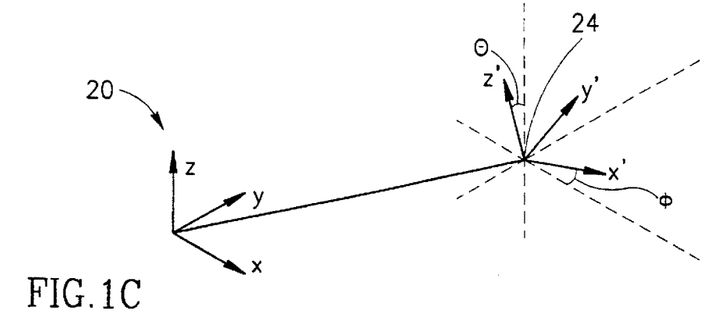
Figure 1D:
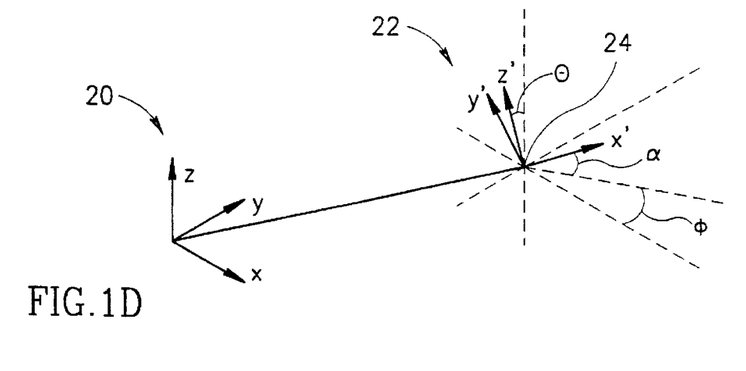

FIGS. 1A through 1D show schematically a set of linear displacements $X,Y,Z$ and sequential rotations by angles $\phi, \theta$, and $\alpha$ respectively, that transform a coordinate system 20 with axes $x,y,z$ into a coordinate system 22 having axes $x',y',z'$. The origin of coordinate system 22 is located at coordinates $X,Y,Z$, relative to coordinate system 20, and axes $x',y',z'$ have an orientation with respect to coordinate system 20 defined by rotation angles $\phi$, $\theta$, and $\alpha$. In FIG. 1A the origin of coordinate system 20 is displaced to point 24 having coordinates $X,Y,Z$ with respect to coordinate system 20. FIGS. 1B through 1D illustrate rotations $\phi$, $\theta$, and $\alpha$ performed sequentially, about the $z'$, $x'$, and $z'$, axes respectively. Following these rotations, the origin of coordinate system 20 is still at location 24 and the orientation of axes $x',y',z'$, with respect to axes $x,y,z$, are defined by angles $\phi$, $\theta$, and $\alpha$ as shown.

The coordinates $x,y,z$ of a point in space relative to coordinate system 20 and the coordinates $x',y',z'$ of the same point relative to coordinate system 22 are related by a transformation which is a function of $X,Y,Z,\phi,\theta,\alpha$, where, in matrix notation, the relationship between $x,y,z$ and $x',y',z'$ can be written:

$$\begin{bmatrix} x \\ y \\ z \end{bmatrix} = \begin{pmatrix} -X \\ -Y \\ -Z \end{pmatrix} + \begin{pmatrix} \cos\phi & \sin\phi\cos\theta & -\sin\phi\sin\theta \\ \sin\phi & \cos\phi\cos\theta & -\cos\phi\sin\theta \\ 0 & \sin\theta & \cos\theta \end{pmatrix} \times$$

$$\begin{pmatrix} \cos\alpha & \sin\alpha & 0 \\ -\sin\alpha & \cos\alpha & 0 \\ 0 & 0 & 1 \end{pmatrix} \times \begin{bmatrix} x' \\ y' \\ z' \end{bmatrix}$$

It is convenient to represent the vectors $x,y,z$, and $x',y',z'$, as the second, third and fourth components of four vectors $\vec{\chi}$ and $\vec{\chi}'$ respectively, where the first components of the four vectors are always equal to 1. This allows a coordinate transformation which includes both displacements and rotations to be written in the form of a single matrix. The convention also simplifies various index summations in the least squares procedure presented below. The above relationship can then be written in the form $$\begin{bmatrix} 1 \\ x \\ y \\ z \end{bmatrix} = \begin{bmatrix} \chi_1 \\ \chi_2 \\ \chi_3 \\ \chi_4 \end{bmatrix}$$

$$= \begin{pmatrix} 1 & 0 & 0 & 0 \\ -X & \cos\phi\cos\alpha - \sin\phi\cos\theta\sin\alpha & \cos\phi\cos\alpha + \sin\phi\cos\theta\cos\alpha & -\sin\phi\sin\theta \\ -Y & -\sin\phi\cos\alpha - \cos\phi\cos\theta\sin\alpha & -\sin\phi\sin\alpha + \cos\phi\cos\theta\cos\alpha & -\cos\phi\sin\theta \\ -Z & -\sin\theta\sin\alpha & \sin\theta\cos\alpha & \cos\theta \end{pmatrix} \times \begin{bmatrix} 1 \\ x' \\ y' \\ z' \end{bmatrix}$$

$$= \begin{bmatrix} \chi'_1 \\ \chi'_2 \\ \chi'_3 \\ \chi'_4 \end{bmatrix}$$

It is now easy to see that $\vec{\chi}$ and $\vec{\chi}'$ are related by a single matrix T whose elements are dependent upon $X,Y,Z,\phi,\theta,\alpha$. The relationship between $\vec{\chi}$ and $\vec{\chi}'$ can therefore be conveniently written in the form $\vec{\chi}'=T(X,Y,Z,\phi,\theta,\alpha,)\vec{\chi}=T\vec{\chi}$ and $\vec{\chi}=T^{-1}(X,Y,Z,\phi,\theta\alpha,)\vec{X}'=T^{-1}\vec{\chi}'$.

Figure 2:
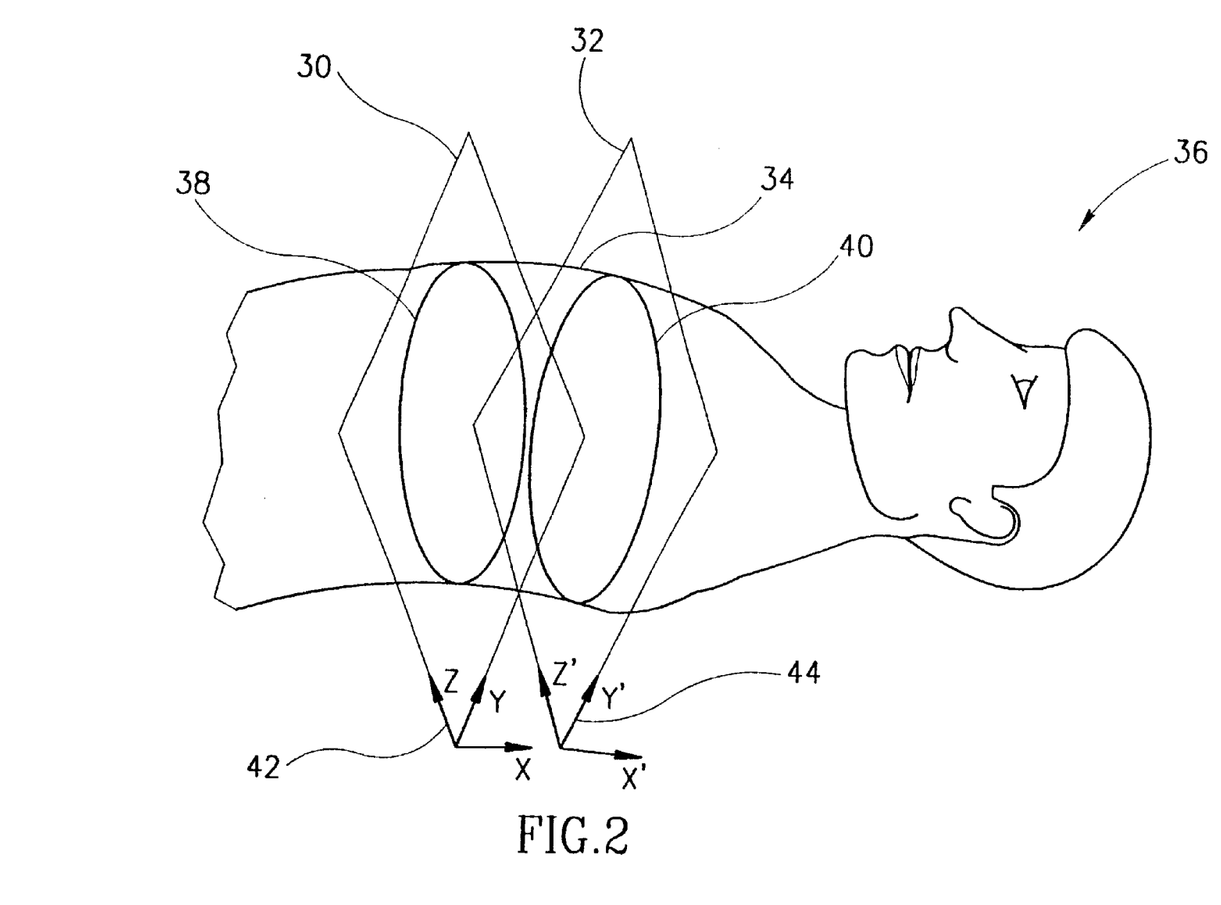
FIG. 2 shows a schematic illustration of two adjacent tomograph slices, a Taylor slice and a target slice, scanned in an ultrasound imaging of the chest region of a person, in accordance with a preferred embodiment of the present invention.

FIG. 2 is a schematic illustration of two adjacent tomograph slices, a Taylor slice 30, and a target slice 32, scanned in an ultrasound imaging of the chest region 34 of a person 36, in accordance with a preferred embodiment of the present invention. (The distance between the slices has been greatly exaggerated for clarity.) Slice 30 and slice 32 intersect chest region 34 in cross sectional areas 38 and 40 respectively of chest region 34. Data points (not shown) in slice 30 are referenced with respect to a coordinate system 42 with coordinate values $x,y,z$. Data points in slice 32 are referenced with respect to a coordinate system 44 with coordinate values $x',y',z'$. The relative positions of coordinate systems 42 and 44 are defined by translations and rotations $X,Y,Z,\phi,\theta,\alpha$, so that $\vec{\chi}'=T(X,Y,Z,\phi,\theta,\alpha,)\vec{\chi}=T\vec{\chi}$ and $\vec{\chi}=T^{-1}(X,Y,Z,\phi,\theta,\alpha,)\vec{\chi}'=T^{-1}\vec{\chi}'$.

In accordance with a preferred embodiment of the present invention, ultrasound image data used for imaging chest region 34 and the image data's normal derivative are acquired for slice 30 in the form of ultrasound imaging function $F(x,y,z)$ and its derivative $\partial F(x,y,z)/\partial z$ at data points located on the plane of slice 30. Since the data points in slice 30 are located on the xy plane of slice 30, the values of the image data and its normal derivative for a data point "n" in slice 30 may therefore be written as $F(x,y,0)|_n$ and $[\partial F(x,y,0)/\partial z|_n$. A Taylor series for the image data, expanded about the point n to first order, may then be written as $F_n(x,y,z) \cong F(x,y,0)|_n + [\partial F(x,y,0)/\partial x|_n][x-x|_n] + [\partial F(x,y,0)/\partial y|_n][y-y|_n] + [\partial F(x,y,0)/\partial z|_n][z-z|_n]$ The derivatives $\partial F(x,y,0)/\partial x|_n$ and $\partial F(x,y,0)/\partial y|_n$ are evaluated from the differences of measured values of the image data in the plane of slice 30.

Values for the image data for slice 32 are acquired in the form of an ultrasound image function $f(x',y',z')$ at data points "m", preferably located on the plane of slice 32. Since the data is acquired for points on the plane of slice 32 the data acquired for a point m for data slice 32 may be written $f(x',y',0)|_m$.

In order to produce a three dimensional image of chest region 34 from images produced from F(x,y,z) and f(x',y',z'), combined with images from a plurality of other tomograph slices of chest region 34, the images for the tomograph slices must be correlated and combined to form a single coherent three dimensional image. This requires that the relative locations and orientations of coordinate systems 42 and 44 and of coordinate systems specific to each of the plurality of other tomograph slices be determined. In accordance with a preferred embodiment of the present invention, this is performed using values acquired for the image data and its normal derivative at data points in each of the tomograph slices used for the three dimensional image.

In accordance with a preferred embodiment of the present invention, the relative locations and orientations of tomograph slices used to produce a three dimensional image of an object are determined by successively determining the location and orientation of each tomograph slice with respect to each of its adjacent tomograph slices. In some preferred embodiments of the present invention the determination of the relative location of adjacent tomograph slices is performed using a least squares procedure described below for adjacent tomograph slices 30 and 32.

Determining the relative location and orientation of coordinate systems 42 and 44 is equivalent to determining the transformation T in the relationships $\vec{\chi}'=T(X,Y,Z,\phi,\theta,\alpha,)\vec{\chi}=T\vec{\chi}$ and $\vec{\chi}=T^{-1}(X,Y,Z,\phi,\theta,\alpha,)\vec{x}'=T^{-1}\vec{\chi}'$ where $\vec{\chi}$ and $\vec{\chi}'$ are the four vectors defined above in the discussion of FIG. 1. T can be determined from the requirement that, at points in space where both F(x,y,z) and f(x',y',z') are defined they should have the same value. For a common data point "m". on the plane of slice 32 therefore, this requires that $[f(\vec{\chi}')|_m - F(T^{-1}\vec{\chi}')|m]=0$ where the four vector notation has been used for the arguments of the functions f and F. If measurements of $f(\vec{\chi}')$ are made for 6 points m, and the form of $F(\vec{\chi})$ is known, then T can be determined, since T is a function of six variables.

However, values for $\vec{\chi}$, $\vec{\chi}'$, $F(\vec{\chi})$ and $f(\vec{\chi}')$ are not known exactly but are each associated with a certain "experimental" uncertainty. As a result, the difference $[f(\vec{\chi}')|_m-F(T^{-1}\vec{\chi}')|m]$ is generally not zero but is distributed about a mean of zero with a certain variance $\sigma|_m$. $\sigma|_m$ can be estimated from estimates of the uncertainties in $\vec{\chi}|_m$, $\vec{\chi}'|_m$. $F(\vec{\chi})|_m$ and $f(\vec{\chi}')|_m$ and can be written as generally dependent upon $\vec{\chi}|_m$, $\vec{\chi}'|_m$, in a form $\sigma(\vec{\chi},\vec{\chi}')|_m=\sigma(T^{-1}\vec{\chi}',\vec{\chi}')|_m$. In accordance with a preferred embodiment of the present invention, T is determined by a least squares procedure which incorporates the uncertainties in the values of $\vec{\chi}$, $\vec{\chi}'$, $F(\vec{\chi})$ and $f(\vec{\chi}')$ for points m. In some preferred embodiments of the present invention, the variance $\sigma|_m$ is assumed to be independent of T. The discussion below applies to this case and $\sigma(T^{-1}\vec{\chi}',\vec{\chi}')|_m$ becomes under this assumption $\sigma(\vec{\chi}')|_m$.

In accordance with a preferred embodiment of the present invention, the least squares sum $$S = \sum_{m=1}^{M} \left([f(\vec{\chi}')-F(T^{-1}\vec{\chi}')]^2 / \sigma(\vec{\chi}')^2\right)\Big|_m,$$

for M points m, is minimized with respect to each of the variables $X,Y,Z,\phi,\theta,\alpha$ which define T. Representing $X,Y,Z,\phi,\theta,\alpha$, respectively by $v_k$ where $k=1 \to 6$, the minimization of S requires that $$\partial S/\partial v_k =$$

$$\partial \left\{ \sum_{m=1}^{M} \left([f(\vec{\chi}')-F(T^{-1}\vec{\chi}')]^2 / \sigma(\vec{\chi}')^2\right)\Big|_m \right\} \Big/ \partial v_k = 0 \text{ for } k = 1 \to 6.$$

Taking the derivatives with respect to $v_k$, the above expression can be written $$\sum_{m=1}^{M} ([f(\vec{\chi}')-F(T^{-1}\vec{\chi}')]/\sigma(\vec{\chi}')^2)\Big|_m \partial F/\partial v_k\Big|_m = 0, \text{ for } k = 1 \to 6.$$

However, $$\partial F/\partial v_k = \sum_{i}^{4} (\partial F/\partial \chi_i)(\partial \chi_i/\partial v_k),$$

$$\partial \chi_i/\partial v_k = \sum_{j=1}^{4} (\partial T_{ij}^{-1}/\partial v_k)\chi_j'$$

and therefore $$\partial F/\partial v_k = \sum_{i}^{4} (\partial F/\partial \chi_i) \sum_{j=1}^{4} (\partial T_{ij}^{-1}/\partial v_k)\chi_j'$$

$$= \sum_{i=1}^{4} \sum_{j=1}^{4} (\partial F/\partial \chi_i)(\partial T_{ij}^{-1}/\partial v_k)\chi_j'$$

so that the least squares equations for determining T can be written $$\sum_{m=1}^{M} ([f(\vec{\chi}')-F(T^{-1}\vec{\chi}')]/\sigma(\vec{\chi}')^2)\Big| \sum_{i=1}^{4}\sum_{j=1}^{4} (\partial F/\partial \chi_i)(\partial T_{ij}^{-1}/\partial v_k)\chi_j'\Big|_m = 0$$

for $k = 1 \to 6$.

The function F, whose analytic form must be known in order to solve the least squares equations, is preferably a first order Taylor expansion of $F(\vec{\chi})$ about a point n, preferably, on the plane of tomograph slice 30. Since the point n is on the plane of tomograph slice 30 the z coordinate of $\vec{x}|_n$ is always 0. The Taylor expansion, to first order in the coordinates of coordinate system 42, can be then be written, $F(\vec{\chi})|_n = F(x,y,z)|_n \cong F(x,y,0)|_n + [\partial F(x,y,0)/\partial x|_n][x-x|_n] + [\partial F(x,y,0)/\partial y|_n][y-y|_n] + [\partial F(x,y,0)/\partial z|_n][z]$.

In order to use this Taylor expansion in the least squares equations, a suitable point n, on tomograph slice 30 has to be chosen for evaluating $\partial F(x,y,0)/\partial x$, $\partial F(x,y,0)/\partial y$, $\partial F(x,y,0)/\partial z$ for each point m on tomograph slice 32 in the least squares sum. Since the accuracy of the Taylor series decreases as the distance from the point about which the Taylor series is expanded increases, preferably, point n is the point on the plane of tomograph slice 30 which is closest to the point m. This point, an "optimum expansion point", is the intersection of the normal from point m to the plane of tomograph slice 30. Such a point n however, cannot be determined without knowing T, and T is not known until a solution to the least squares equations is acquired.

However, in accordance with a preferred embodiment of the present invention, coordinate systems 42 and 44 of tomograph slices 30 and 34 respectively, are very close to each other and have their respective axes nearly parallel. Therefore, a point n on plane 30 which has x and y coordinates in coordinate system 42 numerically equal to the values of the x' and y' coordinates of point m on plane 32 measured with respect to coordinate system 44, (i.e. $x|_n = x'|_m$ and $y|_n = y'|_m$) lies close to the optimum expansion point. The distance from the point m to a point n in the plane of tomograph slice 30 near to the optimum expansion point does not change rapidly with the distance of the point n from the optimum expansion point. (The ratio between the distance from the point m to a point n near to the optimum expansion point and the distance from the point m to the optimum expansion point is on the order of $[1+\theta^2]$, where $\theta$ is the angle between the lines from the point m to the optimum expansion point and the point m to the point n). Therefore, the point n on plane 30 which has x and y coordinates in plane 30 numerically equal to the values of the x' and y' coordinates of point m in plane 32 is a suitable point about which to expand the Taylor series.

In accordance with a preferred embodiment of the present invention, a point n on plane 30 is chosen for the point at which to expand a Taylor series for a point m, such that the values of the x, y coordinates of the point n on the plane of slice 30 are numerically equal to the values of the x', y' coordinates of the point m on the plane of slice 32. In some preferred embodiments of the present invention this choice for the coordinates of the point n are used in a first iteration of an iterative calcualtion to determine T as discussed below.

The close spatial positions of tomograph slices 30 and 32 also permit simplifying approximations to be made for the dependence of matrix elements $T_{ij}$ of T on the angles of rotation $\phi, \theta, \alpha$. The trigonometric functions in the expressions for $T_{ij}$ are preferably replaced with their small angle approximations. For example, $\sin \alpha$ is preferably replaced by $\alpha$ and $\cos \alpha$ is preferably replaced with $(1-\alpha^2/2)$. With these replacements the matrix T becomes $$\begin{pmatrix} 1 & 0 & 0 & 0 \\ -X & \begin{array}{c}(1-\phi^2/2)(1-\alpha^2/2) - \\ \phi(1-\theta^2/2)\alpha\end{array} & \begin{array}{c}(1-\phi^2/2)\alpha - \\ \phi(1-\theta^2/2)\alpha\end{array} & -\phi\theta \\ -Y & \begin{array}{c}-\phi^2(1-\alpha^2/2) - \\ (1-\phi^2/2)(1-\theta^2/2)\alpha\end{array} & \begin{array}{c}-\phi\alpha + \\ (1-\phi^2/2)(1-\theta^2/2)(1-\alpha^2/2)\end{array} & -(1-\phi^2/2)\theta \\ -Z & -\theta\alpha & \theta(1-\alpha^2/2) & (1-\theta^2/2) \end{pmatrix}.$$

This matrix can preferably be further simplified by dropping second order or higher terms in the angles so that $$T = \begin{pmatrix} 1 & 0 & 0 & 0 \\ -X & 1 & \alpha & 0 \\ -Y & -\phi-\alpha & 1 & \theta \\ -Z & 0 & \theta & 1 \end{pmatrix}.$$

The above simplifying approximations are preferably used for a first iteration in an iterative calculation to determine T. For example, in some preferred embodiments of the present invention an iterative calculation is used to determine T in which, from one iteration to a next iteration in the calculation, for each point m the coordinates of the point n about which the Taylor series is expanded become progressively closer to the coordinates of the optimum expansion point for the point m. The calculation begins with a first iteration to make a first determination of T preferably using, for each point m, an expansion point n having x and y coordinates equal to the x' and y' coordinates of the point m. This first determination of T is used to calculate for each point m, coordinates for the intersection point of the normal to the plane of slice 30 from the point m. These coordinates are used as the coordinates of the expansion point n for the point m in a second iteration of the calculation to make a second determination of T. The process is repeated in subsequent iterations of the calculation, each time using a determination of T made in one iteration of the calculation to determine for each point m new coordinates for the expansion point n for the next iteration of the calculation. The calculation ends when changes in the values of the coordinates of the expansion points n from one iteration to the next become suitably small or when a particular determination of T results in the function $F(T^{-1}\vec{\chi}')$ (as expressed in the Taylor series about the points n), accurately representing the values of the function $f(\vec{\chi}')$ at the points $|m$. The accuracy with which $F(T^{-1}\vec{\chi}')$ represents the values of $f(\vec{\chi}')$ is preferably determined by appropriate statistical tests known in the art such as a deviations mean square or an F test.

Similarly, the simplifying assumptions used for the trigonometric functions can be iteratively relaxed to improve the accuracy with which the elements $T_{ij}$ of T are evaluated. For example, in some preferred embodiments of the present invention, a first iteration in an iterative calculation of T uses the small angle approximations for the angles θ, φ, and α, sin θ=θ, sin φ=φ and sin α=α. At the completion of the first iteration, values θ1, φ1, and α1 are determined for these angles. In the second iteration of the calculation, sin θ (and similarly for the angles φ and α.) becomes sin(θ1+θ2)=θ2+ sin θ1, where θ2 is to be determined by the second iteration, and θ2<θ1. In the third iteration sin θ becomes sin(θ1+θ2+ θ3)=θ3+sin(θ1+θ2), and so on for subsequent iterations. As in the case of the coordinates for the points n, the calculation ends when changes in the values of the angles from one iteration to the next become suitably small or when a particular determination of T results in the function $F(T^{-1}\vec{\chi}')$ accurately representing the values of the function $f(\vec{\chi}')$ at the points |m.

It should be realized, in accordance with a preferred embodiment of the present invention, that various combinations of the described approximations can be used simultaneously in calculations of T. Furthermore, in iterative calculations, one variable of the transform T can stop changing from one iteration to the next before another stops changing.

In the least squares sum $$\sum_{m=1}^{M}([f(\vec{\chi}')-F(T^{-1}\vec{\chi}')]^2/\sigma(\vec{\chi}')^2)|_m,$$

preferably, M is the smallest integer possible, greater than or equal to 6, which, provides a desired accuracy for the values of $v_k$ (i.e. for X,Y,Z,φ,θ,α.). Preferably, $\partial\{S\}/\partial v_k=0$ is first solved for M equal to a small integer greater than or equal to 6 and then solved in an iterative procedure for increasing values of M until a desired accuracy for $v_k$ is reached.

In order to improve the accuracy of the determination of T and/or the speed with which determined solutions for T in an iterative procedure converge to an acceptably accurate solution for T, points M are chosen so that they are relatively far apart. Additionally or alternatively, points m are chosen so that their corresponding points n are such that the first derivatives, $\partial F(x,y,0)/\partial x|_n$, $\partial F(x,y,0)/\partial y|_n$, $\partial F(x,y,0)/\partial z|_n$, are relatively large.

Figure 3:
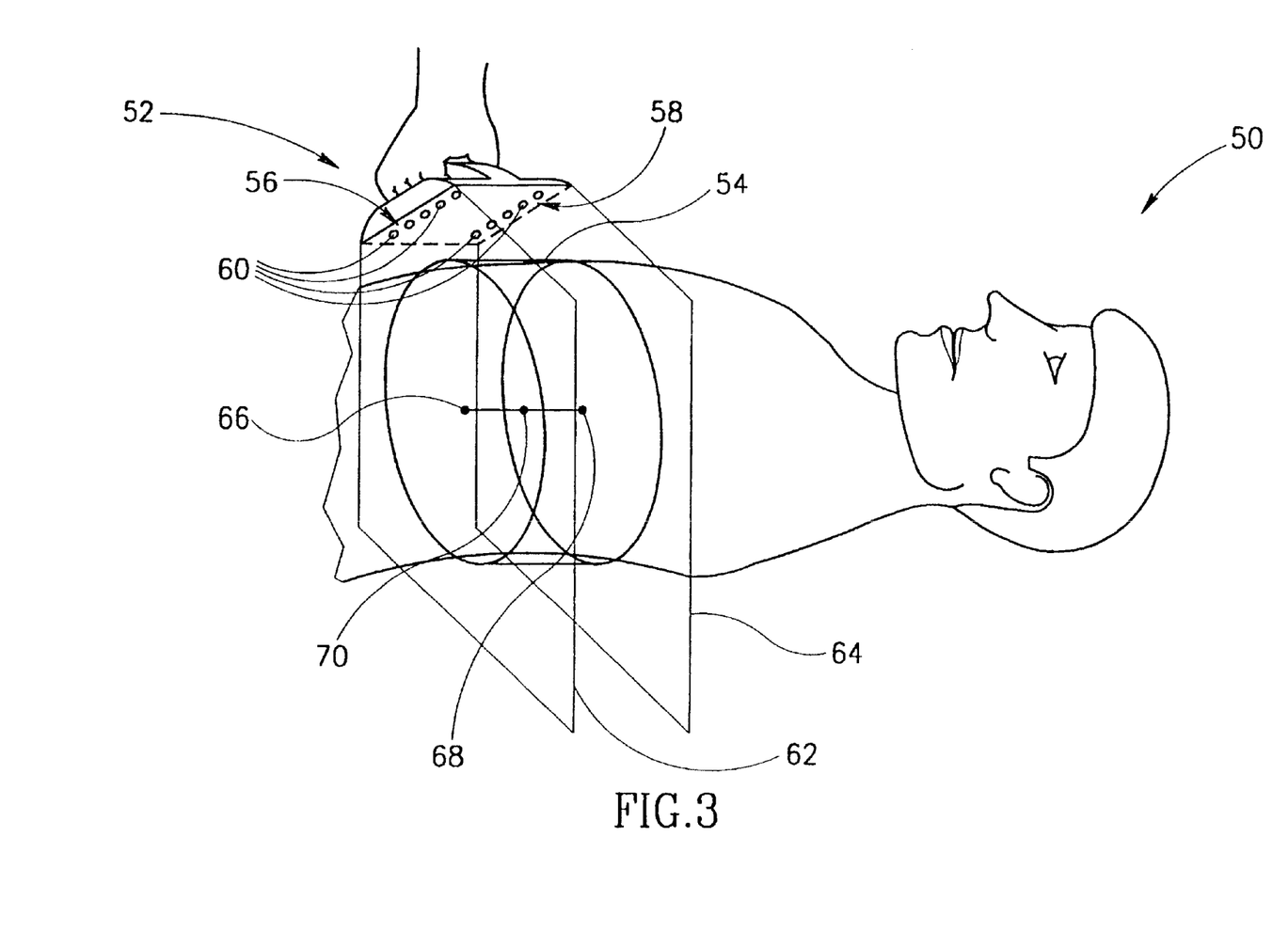
FIG. 3 shows a schematic of a person being scanned for an ultrasound image with an ultrasound hand scanner, in accordance with a preferred embodiment of the present invention.

FIG. 3 shows a person 50 being scanned for an ultrasound image with an ultrasound hand scanner 52, in accordance with a preferred embodiment of the present invention that acquires image data and its normal derivative for a tomograph slice 54. Ultrasound hand scanner 52 preferably, comprises two parallel, very closely spaced, linear phased arrays 56 and 58 of transducers 60, for transmitting and receiving ultrasound waves. Phased arrays 56 and 58 acquire ultrasound image data on two parallel, very closely spaced, data planes 62 and 64 that pass through person 50. Data planes 62 and 64 define the volume of tomograph slice 54. The spacing between data planes 62 and 64 and relative dimensions of other elements in FIG. 3 are greatly exaggerated for clarity of presentation, the planes are actually very closely spaced.

The average of the values of the image data at a point 66 on data plane 62 and at a second point 68 on data plane 64 having the same x and y values as point 66, provides a value for the image data at a point 70 midway between points 66 and 68, for tomograph slice 54. The difference between the values of the image data at points 66 and 68, divided by the distance between planes 62 and 64, provides the derivative of the image data normal to the plane of tomograph slice 54.

The present invention has been described using a non limiting detailed description of a preferred embodiment thereof. Variations of the embodiment described will occur to persons of the art. For example, the ultrasound scanner described can be constructed with more than two parallel rows of transducers. imaging data for an ultrasound imaging function can thereby be collected for a plurality of data points in an ultrasound tomograph slice, wherein the data points are distributed on more than two planes in the slice. This provides sufficient data to calculate derivatives of an imaging function which are of higher than first order which enables the imaging function to be modeled by Taylor series of higher order than first. Higher order Taylor series can be used in procedures to correlate the relative positions of two ultrasound tomograph slices in accordance with a preferred embodiment of the present invention. It further, enables estimates of the accuracy of an "n"th order Taylor series, at a given distance from the origin of the Taylor series, to be estimated using an (n+1)st derivative of the Taylor series by procedures known in the art. Additionally, methods other than those mentioned can be advantageously employed to simplify mathematical procedures in accordance with a preferred embodiment of the present invention. In particular, a priori knowledge on motion constraints of the system, or of the existence of reduced sensitivity of an imaging function to different types of displacements, can be used to reduce to less than six the number of independent variables needed to determine the transform T.

The detailed description is provided by way of example and is not meant to limit the scope of the invention which is limited only by the following claims:

What is claimed is:

1. A method of ultrasound imaging comprising:
   (a) providing utltrasound image data in a first slice defined by a first plane in a first coordinate system;
   (b) providing ultrasound image data in a second slice defined by a second plane in a second coordinate system different from the first coordinate system;
   (c) determining ultrasound image data in a region adjacent to at least one of said first and second planes, from derivatives of the acquired image data, normal to its respective plane; and
   (d) determining a coordinate transformation between the first and second coordinate systems based on said acquired ultrasound image data and said determined ultrasound image data.

2. A method according to claim 1 wherein determining ultrasound image data in regions adjacent at least one of said first and second planes comprises acquiring image data outside of the plane of the slice.

3. A method according to claim 1 wherein said derivatives comprise derivatives of said image data along directions parallel to the plane.

4. A method according to claim 1 wherein determining a coordinate transform comprises:
   defining a first function of coordinates of the first coordinate system representative of said ultrasound image data of said first slice;
   defining a second function of coordinates of the second coordinate system representative of said ultrasound image data of said second slice; and
   requiring that said first and second functions be substantially equal at each of a plurality of points in space.

5. A method according to claim 4 wherein defining said first function comprises determining spatial derivatives for said first slice and defining a plurality of Taylor series wherein each Taylor series is expanded about a point in the plane of the first slice.

6. A method according to claim 5 wherein said Taylor series comprises a first order Taylor series.

7. A method according to claim 4 wherein image data at a second point on the plane of the second slice is matched to image data from the first slice and wherein said matching is performed by matching said second slice image data to a Taylor series of image data expanded about a first point on the plane of said first slice.

8. A method according to claim 7 wherein said first point has the same coordinates in said first coordinate system as said second point in said second coordinate system.

9. A method according to claim 7 wherein said transformation is derived by matching a plurality of said first points to a plurality of said second points.

10. A method according to claim 9 wherein said transformation is derived using an optimization procedure.

11. A method according to claim 9 wherein points of the plurality of points have a large first derivative.

12. A method according to claim 9 wherein at least some points of the plurality of points are spatially relatively far apart.

13. A method according to claim 9 wherein the number of sets of first and second points is greater than the number of independent parameters required for defining said transformation.

14. A method according to claim 9 wherein the optimizing procedure is a least squares procedure.

15. A method according to claim 9 wherein said optimizing procedure incorporates weighting factors that are functions of the accuracy with which locations of and image data values at the first and second points are known.

16. A method according to claim 15 wherein the weighting factors are independent of the transformation.

17. A method according to claim 9 wherein determining said transformation comprises determining said transformation at each iteration of an iterative procedure wherein results of a determination of said transformation in one iteration are used in a determination of the transformation in a subsequent iteration.

18. A method according to claim 17 comprising defining at least one measure of the accuracy of the determination of said transformation at each iteration and determining a cutoff value for each of said at least one measure of accuracy.

19. A method according to claim 18 wherein said measure of accuracy is a deviations mean square test.

20. A method according to claim 9 wherein said measure of accuracy is an F test.

21. A method according to claim 9 wherein said transformation is applied to data in one of said coordinate systems and including:
determining an improved coordinate transformation between the first and second coordinate systems based on said acquired ultrasound image data and said determined ultrasound image data.

22. A method according to claim 21 wherein determining an improved coordinate transformation comprises matching image data at a second point on the second slice to image data from the first slice and wherein said matching is performed by matching said second slice image data to a Taylor series of image data expanded about a first point on said first slice.

23. A method according to claim 22 wherein said first point has the same coordinates in said first coordinate system as said second point in said second coordinate system after applying said transformation.

24. A method according to claim 21 wherein said improved coordinate transformation is derived by matching a plurality of said first points to a plurality of said second points in an optimization procedure.

25. Apparatus for three dimensional ultrasound imaging of an object comprising:
transducers arrayed in a geometry to acquire ultrasound imaging data in an imaging slice of the object, which imaging slice is defined by a plane, so that data of the acquired data is acquired at points on both sides of the plane of the slice;
a processor which processes said data to provide spatial derivatives of said data in a direction normal to the plane of the imaging slice; and wherein
said processor determines the relative positions of a plurality of imaging slices using said acquired data and said derivatives to provide a three dimensional image of said object.

26. Apparatus according to claim 25 wherein the processor also provides spatial derivatives of said data n at least one direction parallel to the plane of the imaging slice.

27. A method of ultrasound imaging comprising:
(a) providing ultrasound image data in a first slice defined by a first plane in a first coordinate system;
(b) providing ultrasound image data in a second slice defined by a second plane in a second coordinate system different from first coordinate system;
(c) determining ultrasound image data in a region adjacent to at least one of said first and second planes, said region including at least a portion of one of said first and second planes; and
(d) determining a coordinate transformation between the first and second coordinate systems based on said acquired ultrasound image data and said determined ultrasound image data.

28. A method according to claim 27 wherein computing said coordinate transformation comprises matching said determined image data of one slice to acquired image data of a second slice.

29. A method according to claim 4 wherein determining said transformation comprises determining said transformation at each iteration of an iterative procedure wherein results of a determination of said transformation in one iteration are used in a determination of the transformation in a subsequent iteration.

\* \* \* \* \*